United States Patent
Zhang et al.

(10) Patent No.: US 8,185,049 B2
(45) Date of Patent: May 22, 2012

(54) MULTI-MODE DEVICE REGISTRATION

(75) Inventors: Jiang Zhang, La Jolla, CA (US); Petr Peterka, La Jolla, CA (US)

(73) Assignee: General Instrument Corporation, Horsham, PA (US)

( * ) Notice: Subject to any disclaimer, the term of this patent is extended or adjusted under 35 U.S.C. 154(b) by 529 days.

(21) Appl. No.: 12/345,002

(22) Filed: Dec. 29, 2008

(65) Prior Publication Data

US 2010/0167656 A1 Jul. 1, 2010

(51) Int. Cl.
*H04B 7/00* (2006.01)

(52) U.S. Cl. .................................................. 455/41.2

(58) Field of Classification Search .............. 455/41.2, 455/66.1, 435.1, 435.2, 435.3; 713/171
See application file for complete search history.

(56) References Cited

U.S. PATENT DOCUMENTS

| | | | |
|---|---|---|---|
| 5,909,183 A | 6/1999 | Borgstahl et al. | |
| 6,199,136 B1 | 3/2001 | Shteyn | |
| 6,826,607 B1 | 11/2004 | Gelvin et al. | |
| 6,995,655 B2 | 2/2006 | Ertin et al. | |
| 7,912,076 B2 * | 3/2011 | Kim et al. | 370/401 |
| 2002/0077077 A1 | 6/2002 | Rezvani et al. | |
| 2003/0095521 A1 | 5/2003 | Haller et al. | |
| 2005/0014503 A1 | 1/2005 | Nakakita et al. | |
| 2005/0210261 A1* | 9/2005 | Kamperman et al. | 713/182 |
| 2006/0116107 A1 | 6/2006 | Hulvey | |
| 2006/0156340 A1 | 7/2006 | Choi | |
| 2006/0177066 A1 | 8/2006 | Han et al. | |
| 2006/0224893 A1 | 10/2006 | Sales et al. | |
| 2007/0150720 A1 | 6/2007 | Oh et al. | |
| 2007/0178884 A1 | 8/2007 | Donovan et al. | |
| 2008/0066120 A1 | 3/2008 | Igoe | |
| 2009/0322948 A1 | 12/2009 | Funabiki et al. | |
| 2010/0164693 A1 | 7/2010 | Zhang et al. | |
| 2010/0169399 A1 | 7/2010 | Moroney et al. | |
| 2010/0169646 A1 | 7/2010 | Zhang et al. | |

FOREIGN PATENT DOCUMENTS

| | | |
|---|---|---|
| JP | 2008-035517 | 2/2008 |
| KR | 10-2006-00113926 | 11/2006 |
| KR | 10-0778477 | 11/2007 |
| WO | 2007094347 | 8/2007 |
| WO | 2008-002081 | 1/2008 |

OTHER PUBLICATIONS

PCT Search Report & Written Opinion, RE: Application #PCT/US2009/066529, Jun. 28, 2010.
PCT Search Report and Written Opinion, RE: Application #PCT/US2009/066174. Jun. 23, 2010.
PCT Search Report and Written Opinion, RE: Application #PCT/US2009/065670. Jun. 29, 2010.

(Continued)

*Primary Examiner* — Jeffrey Zweizig
(74) *Attorney, Agent, or Firm* — Susan R. Payne

(57) ABSTRACT

A device configured to communicate with a second device may register a second device using one of multiple registration modes including a domain-registration mode, a device-registration mode, and a no-registration mode. The domain-registration mode allows the second device to register with the device and at least one other device registered with the device, the device-registration mode allows the second device to register with the device and with no other devices, and the no-registration mode does not allow any device to register with the device. The device receives a selection of one of the multiple registration modes and places the device in the selected registration mode.

20 Claims, 7 Drawing Sheets

OTHER PUBLICATIONS

PCT Search Report and Written Opinion, RE: Application #PCT/US2009/066178. Jun. 22, 2010.

A. Menezes, et al, "Handbook of Applied Cryptography", 1996; Chapter 12, pp. 489-541 (see pp. 497-498; 508-511).

Soriente, Claudio et al., "BEDA: Button-Enabled Device Association", First International Workshop on Security for Spontaneous Interaction, Sep. 2007. URL: http://www.comp.lancs.ac.uk/iwssi2007/papers/iwssi2007-01.pdf.

* cited by examiner

MULTI-MODE DEVICE REGISTRATION

RELATED APPLICATIONS

The present invention is related to U.S. patent application Ser. No. 12/345,010, entitled "Personal Identification Number (PIN) Generation between Two Devices in a Network", by Paul Moroney and Jiang Zhang; U.S. patent application Ser. No. 12/344,994, entitled "Method of Targeted Discovery of Devices in a Network", by Jiang Zhang and Petr Peterka; and U.S. patent application Ser. No. 12/344,997, entitled "Secure and Efficient Domain Key Distribution for Device Registration", by Jiang Zhang and Sasha Medvinsky, all of which are incorporated by reference in their entireties.

BACKGROUND

The WIRELESS HOME DIGITAL INTERFACE (WHDI) is a wireless standard proposed for a wireless multimedia device network, which may be used at home, in the office or in other short-range wireless network environments. WHDI allows for high bandwidth wireless channels for sending content between devices, which may support uncompressed High Definition (HD) content. For example, a DVD player may be connected to multiple HDTVs wirelessly and send uncompressed content to the HDTVs using WHDI. WHDI eliminates the need for cabling, such as High Definition Multimedia Interface (HDMI) cables, component cables, etc., used to transmit uncompressed content between devices. Conventional wireless technologies such as 802.11, BLUETOOTH, etc., do not have the bandwidth or interface to transmit uncompressed multimedia content between devices.

WHDI can be used in various environments. For example, a user located in a single family home or in an apartment may connect a DVD player, an MP3 player, a laptop/notebook or desktop personal computer (PC), a gaming console, and flat panel TVs all together, wirelessly, using WHDI. In another environment, a user wirelessly connects a multimedia projector in a conference room to a desktop PC in his office, and to a set of notebook computers of numerous meeting participants using WHDI. In these examples and other examples, security is a concern because of the wireless communication between the WHDI devices. Due to the nature of wireless networks, typically they are easy to identify by unauthorized users. Also, an unauthorized user may attempt to identify and connect to the particular devices connected in a home WHDI network.

The homeowner may desire to keep the identity of their devices private and their devices away from the unauthorized users. For example, a homeowner may not want a neighbor to know they have five HDTVs, or they may not want any non-family members to know they have a server connected to their home network because the server may contain confidential information, such as personal videos, etc. While WHDI provides the protocol and interfaces for high-bandwidth wireless networks, WHDI may lack the security procedures to maintain user privacy. The present invention provides methods of protecting a user's privacy based on the user's current needs for using the WHDI devices in a WHDI network.

BRIEF DESCRIPTION OF THE DRAWINGS

Features of the present invention will become apparent to those skilled in the art from the following description with reference to the figures, in which.

DETAILED DESCRIPTION

Figure 1:
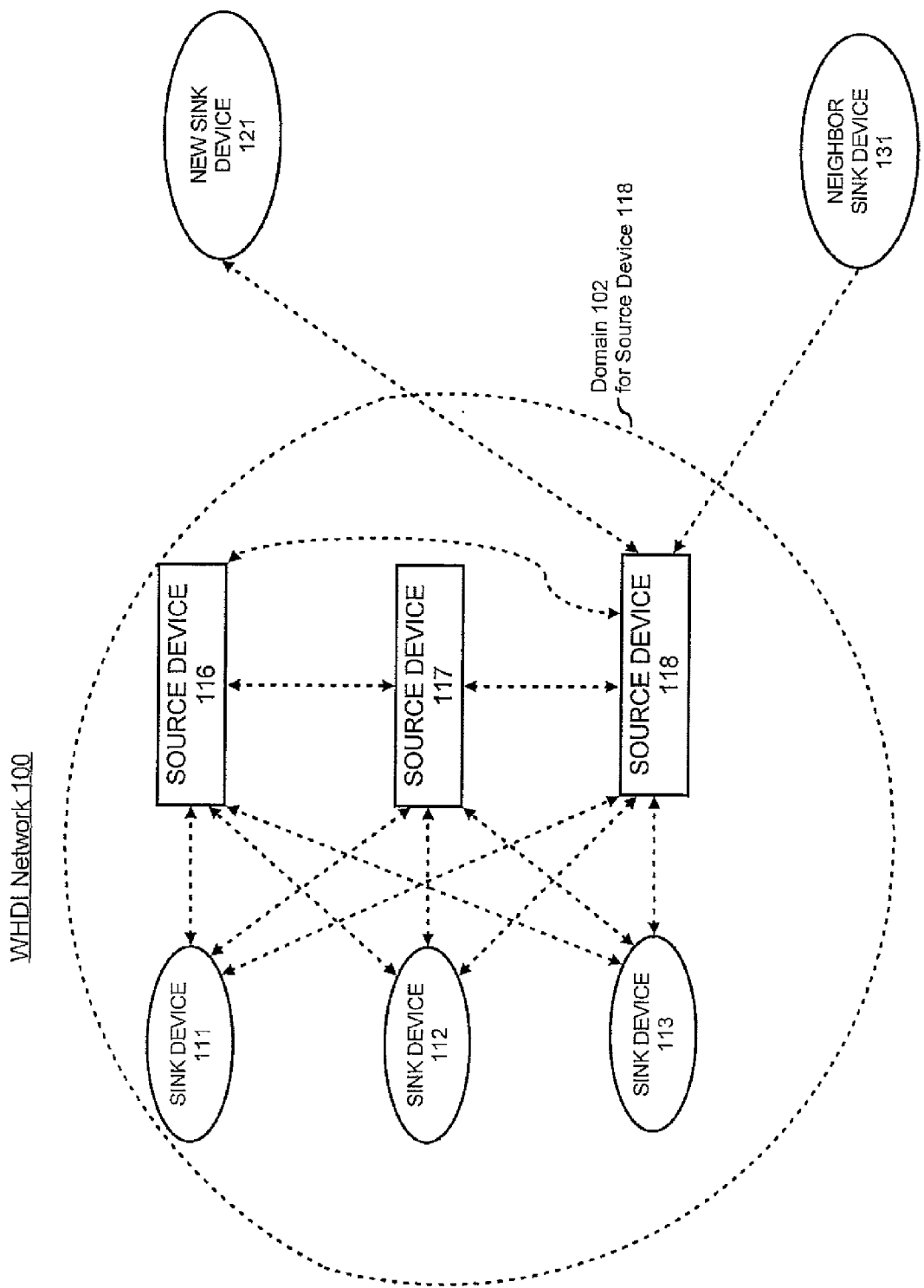
FIG. 1 illustrates a simplified block diagram of a WHDI network, according to an embodiment of the present invention.

For simplicity and illustrative purposes, the present invention is described by referring mainly to exemplary embodiments thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the present invention.

Embodiments of the present invention provide a secure and user-friendly method and system for verifying device certificate, generating Personal Identification Numbers (PINs), exchanging a device registration key, delivering the domain key in a network optionally, and multi-mode device registration to meet different level of registration requirements and also prevent an unauthorized device registration or escalation of registration privilege. The network may be a WHDI network.

WHDI is a proposed standard for high bandwidth wireless digital data connectivity between multiple points. WHDI wirelessly transmits multimedia data, such as high definition video and the associated audio data, from source devices to sink devices in the WHDI network reliably. Devices in a WHDI network are referred to as WHDI devices, and a WHDI network includes WHDI devices communicating wirelessly amongst each other using the WHDI standard. WHDI devices are characterized as two types. One type is a source device and the other type is a sink device. A WHDI device may be a source device, a sink device, or both depending on its functionality. A source device transmits data streams across a WHDI network to a sink device, and a sink device receives data streams across the WHDI network from the source device. Examples of source devices are set-top box, Personal Computer (PC), notebook PC desktop PC, DVD player, MP3 player, video camcorder, audio/video receiver, gaming console, etc. Examples of sink device are TVs, PCs, projectors, etc.

Many device networking technologies including WHDI face the issue of how to securely allow a new device to become part of any existing network. According to an embodiment, a Personal Identification Number (PIN) is used during a device registration process to allow a new device to become part of the network. The device registration is a process to let a new device join another device or a network of devices in a domain. A domain is a group of devices that are approved to share content with each other. Device registration or domain registration includes the process of approving or denying a device to join a device or a domain. Device registration can provide a user with control over which devices are allowed to connect to the other device(s) in the user's domain. So if a family has a domain, then all the devices owned by the family may be members of the domain, but a friend's device may not be allowed to join the domain.

Device registration is important, especially for wireless networks, to prevent unauthorized users from gaining access to a device or a domain and retrieving content. In a wired network, if an unauthorized device is not physically connected to another device in a domain, the unauthorized device cannot retrieve content. However, in a wireless network, such as a WHDI network, it is much easier for an unauthorized device to attempt to connect to a device in a domain to retrieve content.

Another undesirable situation for device registration is escalating the privilege. For example, a user gives another device authorization, through registration, to access a single device in a domain. The other device may try to get access to all the user's devices within the domain. For example, a user's friend living next door borrows the user's gaming console. Once the friend registers his TV with the gaming console and the TV gets the domain key from the gaming console, the friend may try to connect his TV with another device of the user, such as the user's DVD player. This is obviously not what the user wants. According to an embodiment, a system and method of preventing an unauthorized device from registering into a domain or an authorized device from escalating its privilege, in particular, in a wireless network, is provided and shown in FIGS. 4 and 5.

Within this system and method, the device registration is categorized into three modes of registration: Device-Only mode, Source-Domain mode and Sink-Domain mode. Device-Only mode registration only allows the first and second device to exchange a device registration key, while the distribution of a domain key is not allowed. Source-Domain mode registration allows the second device, i.e. the source device, to distribute its domain key to the first device in addition to exchanging a device registration key, such that the first device can join the domain of the second device. Sink-Domain mode registration allows the first device (e.g., a sink device or a source device) that initiates the registration to distribute its domain key to the second device in addition to exchanging a device registration key so that the second device can join the domain of the first device. The Device-Only mode registration has the least privilege since after the registration, each device can only access or communicate with the other device, while the other two modes of registration, i.e. Source-Domain mode and Sink-Domain mode, have higher privilege as after the registration, either the first device or the second device may be able to access or communicate with other devices in the domain. Further, the user who sends out the registration request at the requesting device can select one of the registration modes that is allowed by the registration configuration setting at the requesting device to perform the registration. The selected registration mode should be also allowed by the registration configuration setting of the receiving device. Otherwise the registration request will be rejected.

Prior to a new device being allowed to connect to an existing device or join a domain, the new device must be authorized or pre-approved to ensure that the new device is a device that a user wants to connect to the existing device or be in the domain. The new device first needs to be verified if it is a WHDI standard compliant device. Whether a device is a WHDI standard compliant device can be verified by an existence of a valid WHDI certificate present in the device, where the certificate was issued by the WHDI certificate authority. For example, a family member purchases a new TV, and the family member wants the TV to become part of the family domain, so the TV can play content received from other devices in the family domain, such as a set-top box or a DVD player. However, if a neighbor purchases a TV, the family member likely does not want the neighbor's TV in the family's domain. Furthermore, through a wireless network, the neighbor's TV may inadvertently attempt to become part of the family domain. In order to limit this possibility, a PIN generation method is described in U.S. patent application Ser. No. 12/345,010, entitled "Personal Identification Number (PIN) Generation between Two Devices in a Network", by Paul Moroney and Jiang Zhang to determine whether a new device is authorized to connect to the existing device or join a domain. The PIN may also be used to generate a device registration key, which may be used to securely distribute the domain key that is used by the new device to join the domain.

After a device is determined to be authorized, for example, through exchange of WHDI certificates, according to an embodiment, the PIN is used to generate a device registration key (also referred to as a session key). The session key may be used to securely distribute a domain key to a new authorized device, so the new device can join the domain, if the registration is Source-Domain mode or Sink-Domain mode. According to an embodiment, the session key is normally generated using some random numbers. Three random numbers may also be used to generate the session key, where the third random number may be the PIN or another random number. Alternatively, the session key can also be exchanged using the well-known Diffie-Hellman (DH) method or some other similar methods such as Elliptic Curve Diffie-Hellman (ECDH) method. In the alternative methods, the PIN can be used to derive the session key together with the exchanged shared secret using DH or ECDH.

FIG. 1 illustrates a simplified block diagram of a WHDI network 100 according to an embodiment of the present invention. WHDI network 100 of FIG. 1, for example, shows a set of sink devices 111-113 and a set of source devices 116-118.

In one embodiment with respect to the WHDI network 100, the sink device 111 is a flat panel HDTV in a living room, the sink device 112 is a TV in a kitchen, such as a TV installed on a refrigerator, and the sink device 113 is a TV for a treadmill. Further, the source device 116 is a notebook PC, the source device 117 is DVD player, and the source device 118 is a gaming console. It will be apparent that the WHDI network 100 may include additional sink devices and/or additional source devices not shown and that some of the sink devices and the source device described herein maybe removed or new WHDI devices added.

The source devices 116, 117, and 118, respectively may be any source of content, such as a video content, audio content, or other data content from the Internet. Each of the source devices 116, 117, and 118 may have independent and possibly different content. Also, any one of the source devices 116, 117, and 118 may be connected to one or more of the sink devices 111, 112, and 113 simultaneously (e.g., for multicasting) or separately (e.g., unicasting).

When the sink device 111 attempts to connect to the source device 116 wirelessly within the WHDI network 100 for the first time, the sink device 111 needs to know whether the source device 116 is a secure device for the sink device 111. At the same time, the source device 116 also needs to know whether the sink device 111 is a secure device for the source device 116. Secure device means that the device is a WHDI standard compliant device and the device is authorized to connect to the other device. Whether a device is a WHDI standard compliant device can be verified by an existence of a valid WHDI certificate, which was issued by WHDI certificate authority to the device. An unauthorized device may be a device not owned by a family member, such as a neighbor's device or a friend's device. Because the neighbor's device or a friend's device may come within range of the WHDI network 100, these unauthorized devices may advertently or inadvertently attempt to join the family domain. An example of a new authorized device may be a new TV purchased by the family. If the source device 116 is a media player of your neighbor who wants to stream data of an adult content or an unsolicited advertisement to your HDTV while you are watching a DISNEY channel with kids, the source device 116 would not be a secure device for the sink device 111 either.

One way of verifying whether the source device 116 is a secure device for the sink device 111 is that the source device 116 provides its valid WHDI device certificate to the sink device 111 and the sink device 111 generates a PIN for the source device 116 using a method described in further detail below. At the same time, the source device 116 also verifies whether the sink device 111 is a secure device for it by validating the sink device 111's certificate and optionally whether the generated PINs are matching. For example, PIN generation can be accomplished by entering any input choices, such as pressing particular buttons on the source device 116, pressing buttons in a particular sequence on the source device 116, etc., following one or more instructions from the sink device 111. This way, a user who wants to connect a new device to an existing WHDI device has a simplified method of a PIN generation and entry for the existing WHDI device, for example, by using the interface on the WHDI device.

It is more secure and user-friendly to let the devices generate a PIN at runtime than using a specific PIN already pre-assigned for a particular source device, because it reduces the possibility of the PIN being stolen or the PIN being forgotten by the user, although using a pre-assigned value for each input choice is still an option in the PIN generation. With respect to the certificate validation, a WHDI device initially be loaded with a certificate in the factory as well as the device's identification. Thus, the WHDI device certificates of both devices have to be validated first. After validating each other's certificate, each device also gets the other device's public key, which can be used to encrypt and protect the data transmitted between these two devices.

In FIG. 1, the sink device 111 generates a PIN for the source device 116 based on the type of inputs at the source device 116, such as pressable buttons, or other user input options. The source device 116 can also take part in the PIN generation process by providing some random values to the sink device 111. These random data can be encrypted using the sink device 111's public key and the sink device 111 can decrypt it using its own private key. Once the sink device 111 generates a PIN for the source device 116, the PIN or information needed to generate the PIN is communicated to the source device 116 through the user. After the sink device 111 generates the PIN, indicates user entries, and the user entries are entered at the source device, and the generated PIN is the same, the devices may register with each other and the new device may join the existing domain 102 in the WHDI network 100. However registration is also dependent on the registration mode of the source device, according to an embodiment.

According to an embodiment of the invention, multiple registration configuration settings are provided for a device to define what modes of registration can be done in the device. Based on the three registration modes, i.e. Device-Only mode, Source-Domain mode and Sink-Domain mode, three level of privileges of the registration are defined for the device registration configuration settings: domain-registration mode, device-registration mode, and no-registration mode. If a device is configured into the domain-registration mode, this device will allow other devices to register not only with this device, but also with the domain this device belongs to. If a device is configured into the device-registration mode, this device will allow other devices to register with this device only, but not with the domain this device belongs to. Meanwhile, it should be noted that even if this device is configured as device-registration mode, this device can still register with the other device's domain as long as the other device is configured as domain-registration. If a device is configured into the no-registration mode, this device will not allow any device to register with this device or its domain. For example, the no-registration mode entirely blocks any registration. This may be helpful in some wireless networks such as the WHDI that use the button press to simplify the PIN entry so that the source device won't be bothered by any registration request. For example, the neighbor's sink device 131 in FIG. 1 keeps sending a registration request to the source device 118 and the source device 118 only has limited number of buttons and no display indicating the device is registration status, there might be a risk that a user accidentally presses a button of the source device 118 to allow an unwanted registration. To prevent this situation, the user may set the source device 118 to the no-registration mode after registering the source device 118 with other devices that the user authorized.

The domain-registration mode allows other devices to register with all the devices in a domain, and the device-registration mode allows other devices to register only with a single device in a domain. These modes enhance the protection of other devices within the domain in some particular situations, such as lending a device to a friend. These two modes prevents the privilege from being escalated without authorization. For example, before the user lends a device to a friend, the user may set the registration setting to device-registration so that the friend can use the device, but cannot register with the user's domain that the device belongs to.

FIG. 1 also shows a new sink device 121 and a neighbor's sink device 131. The new sink device 121 may be a new TV the user of the source device 118 bought. When the user tries to connect the new sink device 121 to the source device 118, the new sink device 121 sends a registration request to the source device 118 to register with the source device 118 so that the source device 118 can respond to the new sink device 121. Likewise, when the neighbor's sink device 131 tries to be connected to the source device 118, the neighbor's sink device 131 also sends a registration request to the source device 118 to register with the source device 118. However, the user of the source device 118 may not want the neighbor's sink device 131 to register with the source device 118. After the new sink device 121 registered with the source device 118, the user of the source device 118 may block any further registration attempts by setting the source device 118 to no-registration mode.

If the user of the source device 118 allows either the new sink device 121 or the neighbor's sink device 131 to register with the source device 118, then a PIN is used to register the devices. When the user wants to allow the neighbor's sink device 131 to register with the source device 118, the user may allow the neighbor's sink device 131 to register only with the source device 118 or with all the devices in the domain 102. This can be accomplished using the Device-Only mode registration, which allows the neighbor's sink device 131 to register only with the source device 118, and the Source-Domain mode registration, which allows the neighbor's sink device 131 to register with all the devices in the domain 102. In order to support Source-Domain mode registration, the source device 118 needs to be configured as domain-registration mode. To support Device-Only mode registration, the source device 118 needs to be configured as domain-registration or device-registration.

Figure 2:
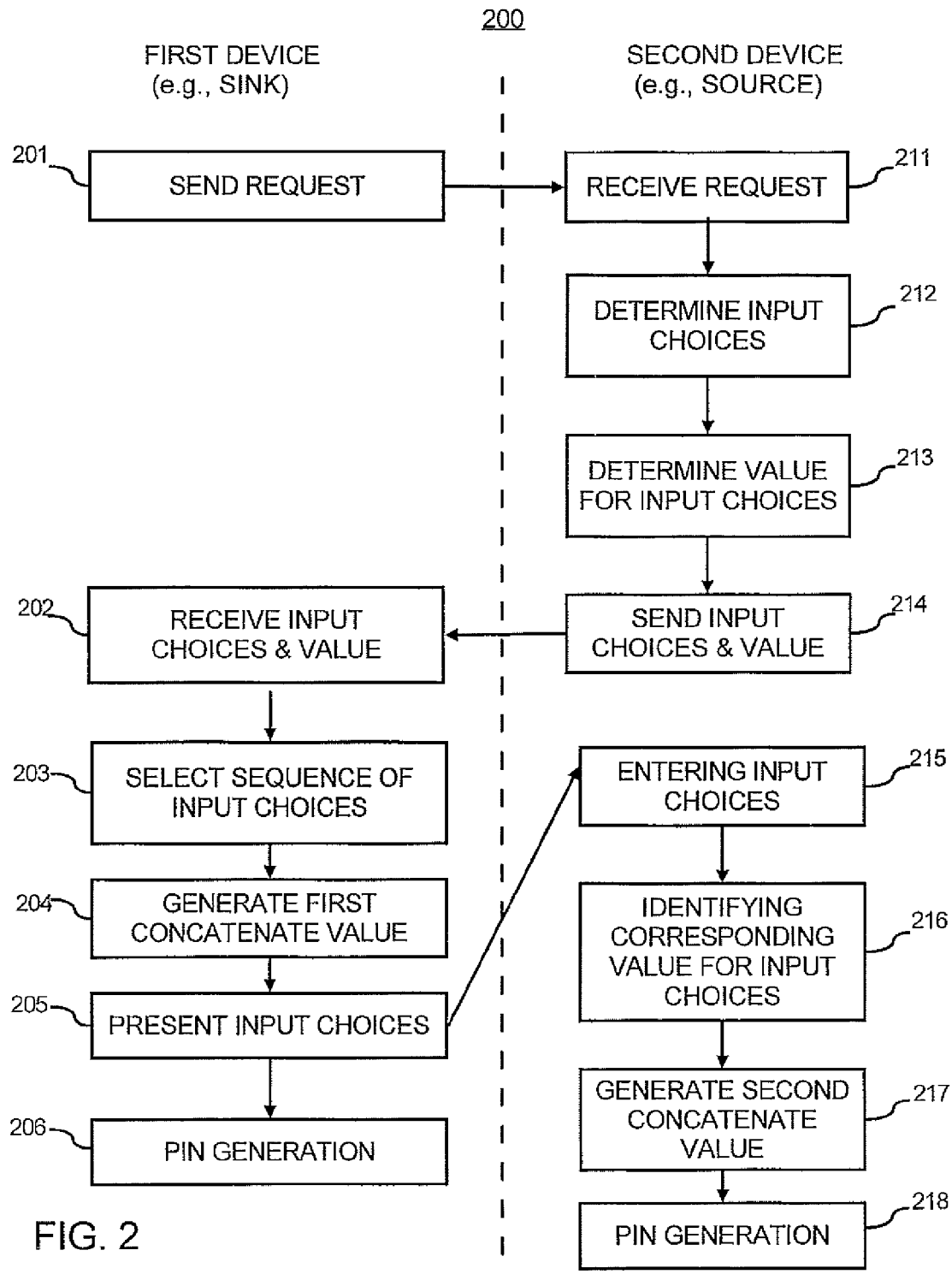
FIG. 2 illustrates a flow diagram of a method for generating and entering a PIN for a domain key between a first device and a second device in a wireless network, according to an embodiment of the present invention.

FIG. 2 illustrates a flow diagram of a method 200 for generating a PIN between a first device and a second device in a wireless network, according to an embodiment of the present invention. In one embodiment, the wireless network is a WHDI network including end user home or office devices. Therefore, in one embodiment, the first device may be the sink device 111 and the second device may be the source device 116 shown in FIG. 1, which is configured to generate a PIN. All the methods herein are described with respect to a WHDI network by way of example and not limitation, and the methods may be used in other systems or other types of networks, including wired or wireless networks.

Also, FIG. 2 shows steps performed by a first device and a second device to generate a PIN. In one embodiment, the first device is a sink device and the second device is a source device, such as the sink and source devices described with respect to FIG. 1 in a WHDI network 100.

At step 201, the first device sends a request to the second device. The request is a message that invokes the PIN generation method 200. Although the step 201 can be an option, the first device's certificate is sent to the second device when the first device sends a request to the second device and the second device uses the public key in the certificate to encrypt the random values for the button list in the following steps. So the encryption key may be included in the request. If the second device is already registered to the first device, the second device may reply to the first device with a message authenticated the previously shared registration key so that the first device can recognize the second device as an option, or the second device may allow the registration process to continue and overwrite the old registration data if the new registration succeeds. If the second device is not registered to the first device, it means that the first device may not have generated a PIN for the second device previously and the second device does not have a registration key for connecting to the first device and further to the WHDI network, which the first device belongs to. When the second device is not registered to the first device, it shall proceed to the next step. In one embodiment, once the second device receives the request for the registration and replies, the second device may enable its buttons for the directed user entry mode for a predetermined period until the button(s) is pressed, otherwise it times out. During the user entry mode, the buttons shall be considered being used for that purpose only. For each WHDI source device, it is possible that the manufacturer may specify a list of buttons and button names that can be used for user entry and subsequent PIN generation.

At step 211, the second device receives the request. The received request, for example, places the second device in a user entry mode, where buttons or other manual inputs on the second device are used for PIN generation.

At step 212, the second device determines input choices, and at step 213, the second device determines values for each input choice. An input choice is information that can be input into the second device. The input choice typically is information that can be manually entered into the second device. In one example, the input choices are associated with buttons on the second device. Examples of input choices of the second device are a set of keypad or button list for function keys, such as "PLAY", "STOP","PAUSE", and "ENTER" depends on the type of the second device. For example, a DVD player as a second device may have buttons for "PLAY", "STOP", and "PAUSE" that are input choices. In another example, a notebook PC may use keys on its keyboard as input choices. Another example of an input choice may be a number of clicks of a button. Such as 3 continuous clicks on PLAY and 2 continuous clicks on PAUSE.

A value is determined for each input choice. Each value may be a random number. Each value may be generated by the second device, for example, using a random number generator, or pre-stored in the second device, such as during the manufacture process.

In one example, the input choices and values are comprised of a button list. The button list includes a button name and value for each button of a set of buttons on the second device. One example of a button list is {(PLAY, 10), (PAUSE, 13), (STOP, 24)}.

At step 214, the second device transmits the input choices and corresponding values to the first device. The transmission can be secured, for example, by encrypting the information being transmitted, so that any other party cannot see the information. For example, when a button list is transmitted to the first device over the WHDI network, if the first device has sent its WHDI device certificate to the second device, the second device may use the first device's public key from the certificate to encrypt the input choices information. The second device may keep the input choices and corresponding values until the registration process is over.

At step 202, the first device receives the input choices and corresponding values from the second device. If the information is encrypted, the first device may decrypt it first. For example, the button list is received from the second device and the first device may use its private key to decrypt the information first.

At step 203, the first device selects a sequence of the input choices. The sequence may be selected randomly. For example, if the button list is {(PLAY, 10), (PAUSE, 13), (STOP, 24)}, the first device selects a random sequence of the buttons, such as {(STOP, 24), (PLAY, 10), (PAUSE, 13)}. The number of input choices in the sequence can be determined by the first device randomly too. Normally the number of input choices can be one or more. Also, an input choice can be repeated for multiple times or not used at all in the sequence.

At step 204, the first device generates a first concatenated value from the values in the selected sequence. The ways to concatenate the values could be many. For example, the sequence is STOP, PLAY, PAUSE. The corresponding values are 24, 10, and 13, respectively. The first concatenated value could be 241013, or the values can be concatenated in binary values, or the values can be concatenated after a transformation, such as adding a number (e.g. 5) to each value, as long as both devices do the same transformation. This step may be performed anytime after the sequence is selected.

At step 205, the first device presents only the input choices, and not both the input choices and corresponding values, in the selected sequence. In one embodiment, the presentation of the sequence may include an audio or visual presentation. For example, if the first device is a TV, the TV displays the sequence of STOP, PLAY, PAUSE. Thus, the presentation can be to a user.

At step 215, the input choices are entered in the second device. This may include manual entry. For example, the user views the displayed the sequence of STOP, PLAY, PAUSE, and pushes STOP, PLAY, PAUSE buttons in that order on the second device.

At step 216, the second device identifies the corresponding value for input choice. For example, the button list is stored in the second device and is retrieved to determine the corresponding value for each input choice.

At step 217, the second device generates a second concatenated value from the values in the sequence of the entered input choices. For example, the sequence is STOP, PLAY, PAUSE. The corresponding values are 24, 10, and 13, respectively. The second concatenated value is 241013. Also there are many ways to concatenate the values with or without transformation, as long as both devices use the same approach.

The concatenated values formed at the first and second devices are the PINs. In other words, each device calculates its own PIN as represented by steps 206 and 218. If both devices generate the same PIN, then one device would be allowed to become a member of the domain or connect to the other device. There are many methods to verify whether these two devices generate the same PIN. The second device may send the PIN back to the first device securely for the first device to verify directly, or the second device may send some data derived from the PIN to the first device for the first device to verify indirectly. In one embodiment, the second device may derive a device registration key from the PIN generated by its own, or from the PIN and some other secret data shared between these two devices, and then use the derived the key to generate a Message Authentication Code (MAC) over an acknowledgement message sent back to the first device. After receiving the acknowledgement message with the MAC from the second device, the first device will use the PIN generated by its own, or use the PIN with some other secret data shared between the two devices, to derive a device registration key, and then use the derived key to verify the acknowledgement message's MAC. If the MAC is verified, which also means the second device has generated the right PIN to derive the right key. Thus, the PINs generated by these two devices are indirectly verified to be same. If the MAC verification failed, which means the PIN generated by the second device may not be same as the PIN the first device generated. If so, the PIN verification failed and these two devices may not be able to connect with each other to share content. The user may restart the process again to make the PIN verification successful, such that the first device and second device may effectively belong to the same domain or connect to each other, and can communicate further.

In one embodiment, the PINs are used to generate device registration keys. To verify whether the derived keys are same, we can indirectly verify whether the PINs are same. If the device registration keys derived from the PINs match, then the first device exchanges a shared device registration key with the second device and they become registered with each other. Note that the user of an unauthorized first device would not be able to access the second device and enter the input choices to generate the same PIN on the second device using the method 200, and the user of an unauthorized second cannot initiate a registration request from the first device, so the method 200 prevents unauthorized devices from becoming registered with another device.

In one embodiment, the components of the WHDI network 100 in FIG. 1 can be grouped into subsystems. These WHDI subsystems interact with other devices throughout the system, including source devices and their accompanying sink devices, to share the content resident within or sent to the WHDI network 100.

An embodiment of a method in which the WHDI network 100 as well as the method 200 may be employed for distributing a domain key for device registration in a domain among different WHDI devices will now be described with respect to the following flow diagram of the method 300 depicted in FIGS. 3A and 3B. It should be apparent to those of ordinary skill in the art that the method 300 represents a generalized illustration and that other steps may be added or existing steps may be removed, modified or rearranged without departing from the scopes of the method 300. In addition, the method 300 is described with respect to the WHDI network 100 and the method 200 by way of example and not limitation, and the method 300 may be performed in other types of networks that may be wired or wireless.

Figure 3A:
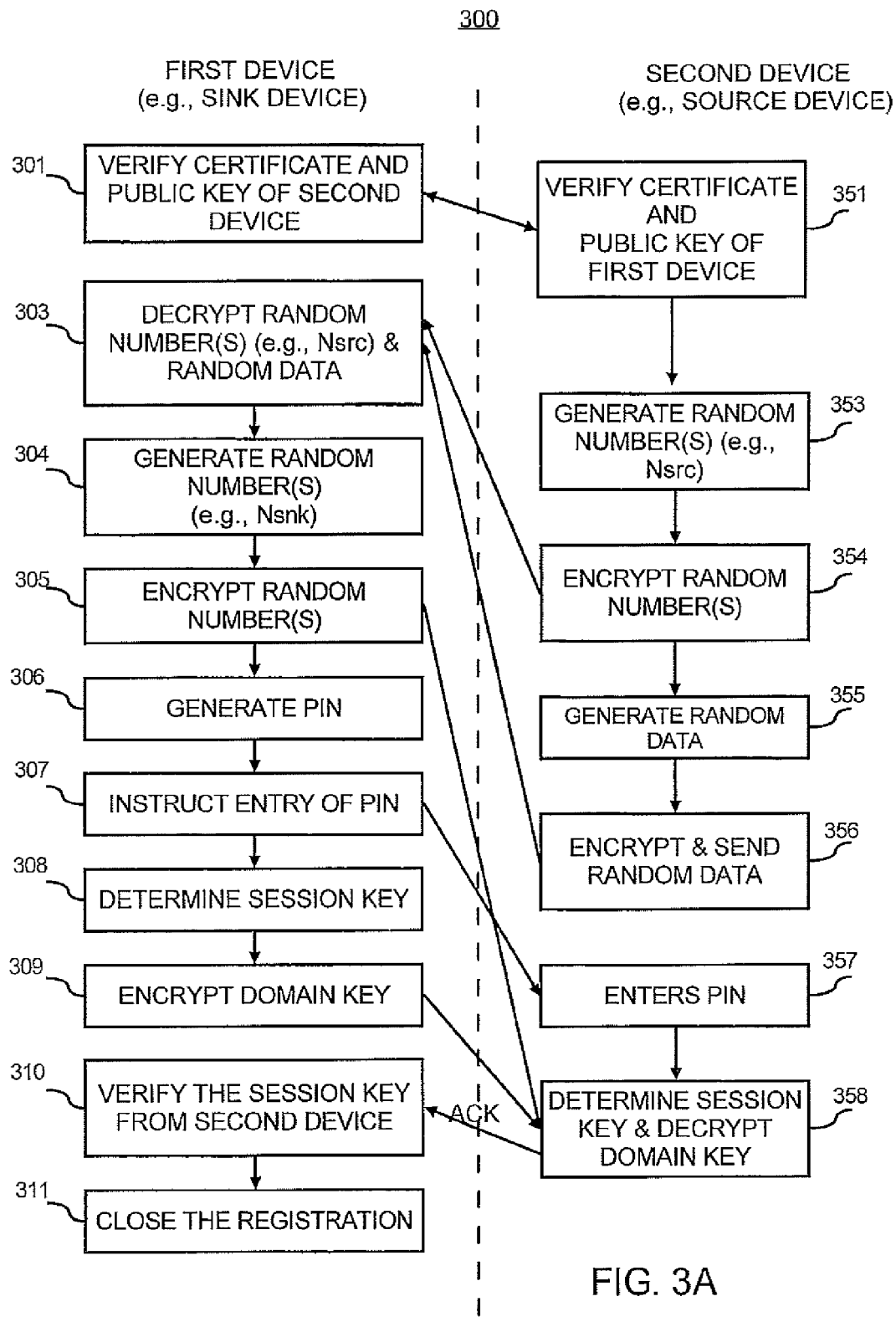
FIG. 3A illustrates a flow diagram of a method for securely delivering a domain key for device registration between a first device and a second device in a wireless network, according to an embodiment of the present invention.

FIG. 3A illustrates a flow diagram of a method 300 for securely distributing a domain key for device registration between a first device and a second device in a wireless network, according to an embodiment of the present invention. In one embodiment, the first device is the sink device 111 and the second device is the source device 116 shown in FIG. 1. In one embodiment, the sink device 111 has a domain key and will distribute the domain key securely to the source device 116. In the other embodiment, the source device 116 has a domain key and will distribute the domain key securely to the sink device 111.

At steps 301 and 351, the first and second devices verify that each device is a certified WHDI device. The first device provides its valid WHDI device certificate to the second device and the second device provides its valid WHDI device certificate to the first device. At step 301, the first device verifies the certificate of the second device and at step 351, the second device verifies the certificate of the first device. Device authorization may be performed using the method 200 to determine that a device requesting to join a domain is an authorized device. After the first and second devices authenticate and authorize, as described above with respect to the steps 301 and 351, exchange of information for generating a session key begins.

At steps 353, a random number is generated at the second device. This random number is referred to as Nsrc. At step 354, Nsrc is encrypted using the public key from the certificate of the first device and sent to the first device. For example, the second device transmits Nsrc over a WHDI network to the first device, and Nsrc is encrypted with the public key of the first device.

At steps 355 and 356, random data is generated at the second device, encrypted and sent to the first device. Steps 355 and 356 are optional. The random data may be used by the first device to generate a PIN, or other data may be used to generate a PIN.

At step 303, the first device decrypts Nsrc and the random data. At step 304, the first device generates a random number, referred to as Nsnk. At step 305, the first device encrypts Nsnk, for example, with the public key of the second device, and sends the encrypted Nsnk to the second device at step 305.

At step 306, the first device generates a PIN. The PIN may be a random value. The PIN may be generated from random data received from the second device. Steps 355 and 356 describe sending the random data to the first device. In other embodiments, the PIN may be a one-time use PIN that is randomly generated by the first device, or the PIN may be the PIN generated from the concatenated values described with respect to step 217 in the method 200.

At step 307, the first device generates instructions to enter the PIN in the second device. For example, instructions are displayed that tell a user to manually enter the pin in the second device, for example, using a keypad or remote control for the second device. The instructions may be displayed on the first device to the user.

At step 357, the PIN is entered in the second device. At this point, each device should have Nsrc, Nsnk, and the PIN, and each device can generate the session key on its own using this information and the same key generation function. At step 308, the first device generates a session key using a key generation function, F, where session key=F(Nsrc, Nsnk, PIN). The second device stores the same function F and generates the same session key using F(Nsrc, Nsnk, PIN). At step 309, the first device encrypts a domain key using the session key, and sends the encrypted domain key to the second device. Note that this is the secure transmission of the domain key to the second device using the session key. The security of the transmission is improved by the use of three random values, including a one-time used PIN, which makes it more difficult for an authorized user to generate the session key and get the domain key. When an attacker is using the first device trying to register with the second device, if the user of the second device does not input the PIN at the second device, the registration will not complete. When the attacker is using the second device to register with the first device, it is even harder because the second device cannot start the registration process. As the PIN is used only once, the attacker cannot use one device to get the PIN and apply to another device without being authorized by the user.

At step 358, the second device decrypts the domain key using the session key it generated. The second device can decrypt the domain key only if it generated the same session key as the first device. The second device sends an acknowledgement message (ACK) to the first device, which indicates that the second device is able to decrypt the domain key. At step 310, the first device receives the ACK to verify that the second device has the correct session key to decrypt the domain key. Now the second device can present the domain key to join the domain of the first device. The registration may then be closed at step 311.

Figure 3B:
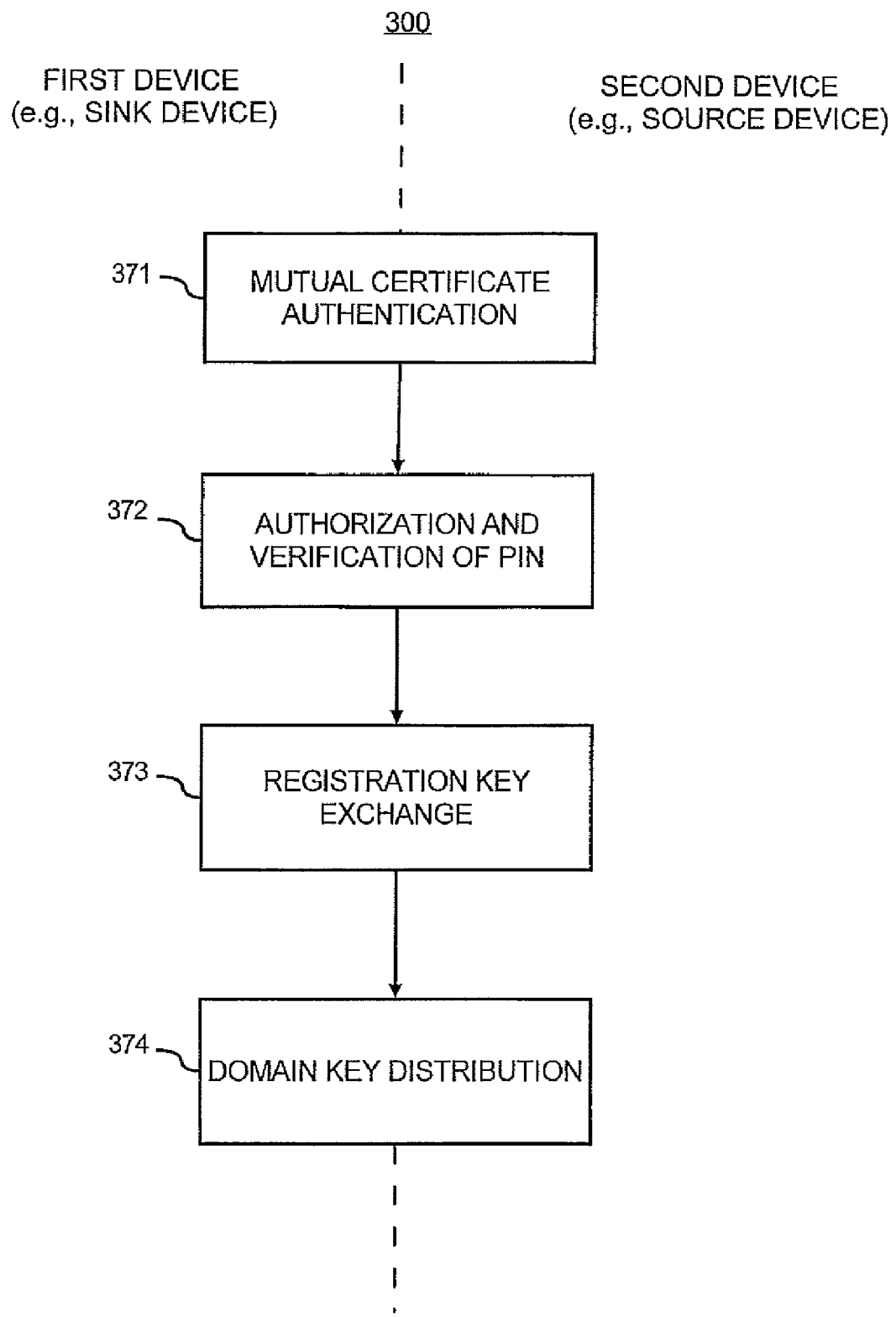
FIG. 3B illustrates a flow diagram of a simplified method for secure and efficient domain key distribution for device registration between a first device and a second device in a wireless network, according to an embodiment of the present invention.

FIG. 3B illustrates a flow diagram of a simplified method for secure and efficient domain key distribution for device registration between a first device and a second device in a wireless network, according to an embodiment of the present invention. The steps of method 300 as described in FIG. 3A is simplified into the four simple functions as shown in FIG. 3B. At step 371, the first device and the second device accomplishes mutual certificate authentication. At step 372, the first device and the second device authorize one-time use PIN and verifies the one-time use PIN. At step 373, the first device and the second device exchange the registration key each other. Finally, at step 374, the first device and the second device distribute the domain key. Thus, the method 300 accomplishes mutual certificate authentication, authorization PIN verification, registration key exchange and domain key distribution.

Figure 4:
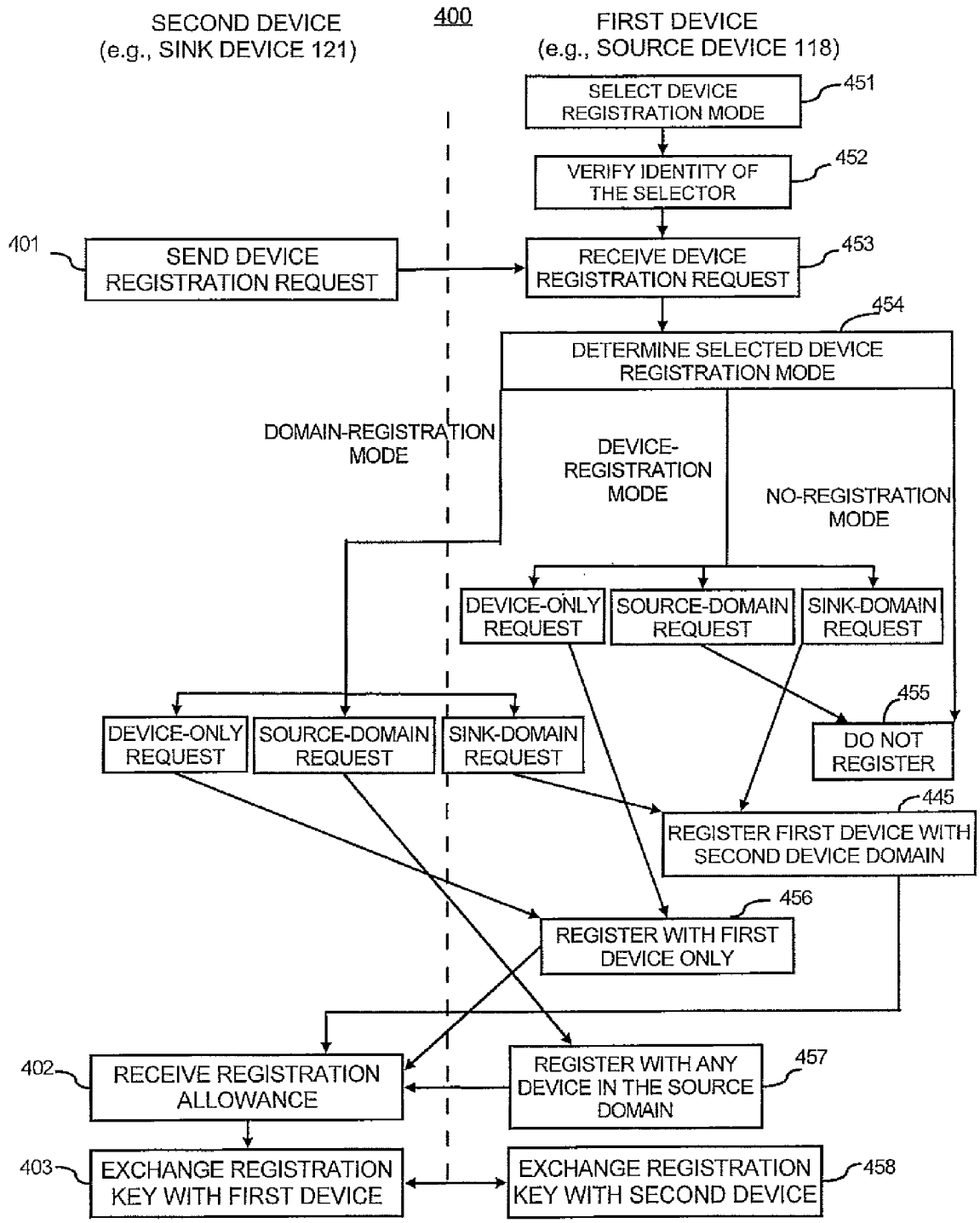
FIG. 4 illustrates a flow diagram of a method for multi-mode device registration between a first device and a second device, according to an embodiment of the present invention.
Figure 5:
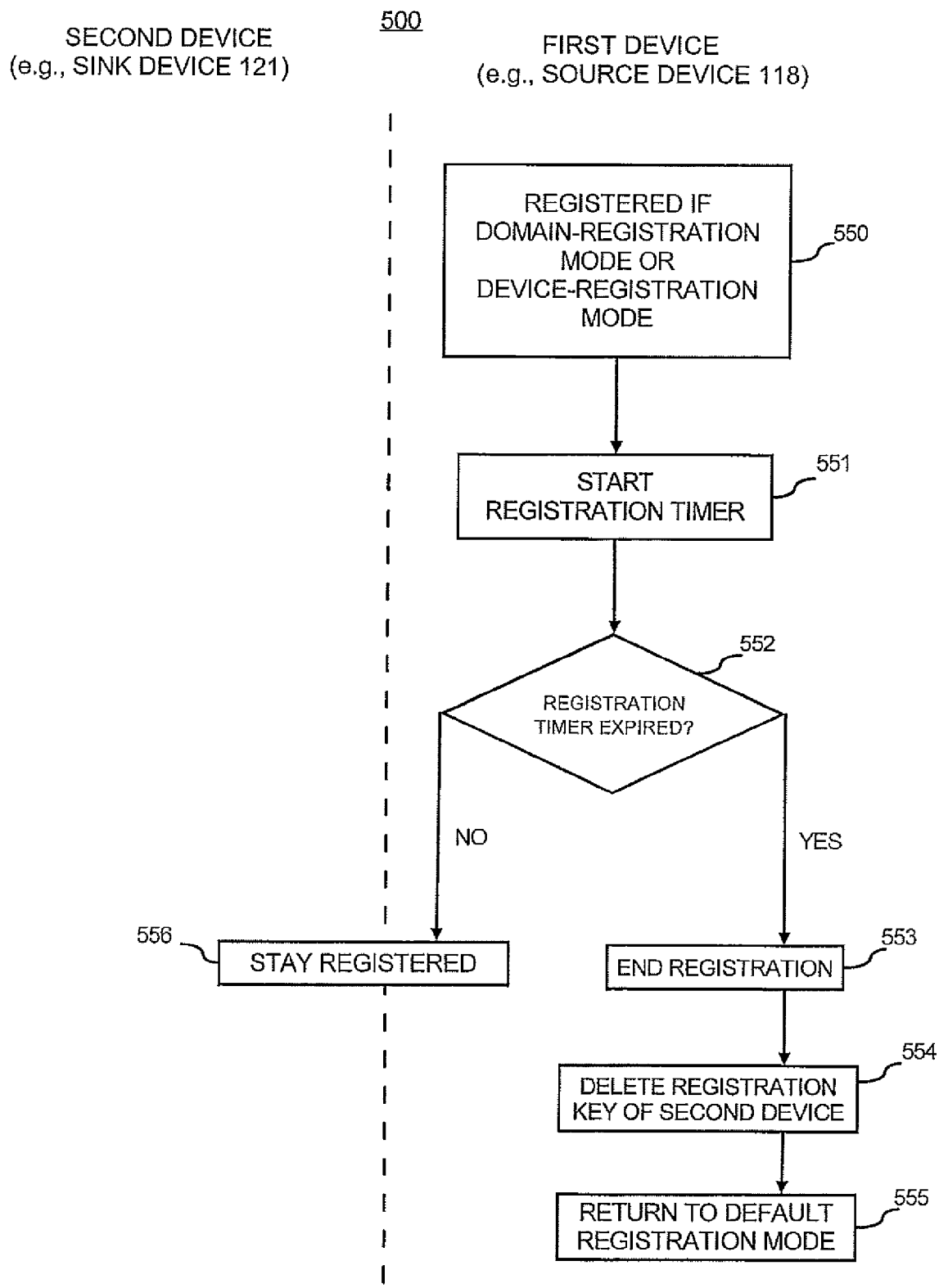
FIG. 5 illustrates a flow diagram of a method for multi-mode device registration that employs a registration timer between a first device and a second device, according to an embodiment of the present invention.

An embodiment of a method in which the WHDI network 100 as well as the methods 200 and 300 may be employed for multi-mode device registration configuration in different WHDI devices will now be described with respect to the following flow diagram of the method 400 depicted in FIG. 4. Please note that in FIG. 4, the un-numbered two blocks on the left side of the dashed vertical line supposedly should be on the right side of the dashed vertical line if the space allows. It should be apparent to those of ordinary skill in the art that the method 400 represents a generalized illustration and that other steps may be added or existing steps may be removed, modified or rearranged without departing from the scopes of the method 400. In addition, the method 400 is described with respect to the WHDI network 100, and the methods 200 and 300 by way of example and not limitation, and the method 400 may be performed in other types of networks that may be wired or wireless. Note that the first device and the second device used for the source device 118 and the sink device 121, respectively as exemplary devices in FIGS. 4 and 5 may be different from the first device and the second device used for the sink device and the source device, respectively as exemplary devices in FIGS. 2, 3A, and 3B. Although the descriptions related to FIGS. 4 and 5 are using an embodiment where the first device is a source device and the second device is a sink device, in another embodiment where the second device is a source device. It is the second device that sends a registration request and it is the first device that responds to the registration request.

Device registration is a process for two devices to initially verify each other's identity and exchange a device registration key or a domain key so one device can connect to another device or become a member of another device's domain. FIG. 4 illustrates a flow diagram of a method 400 for multi-mode device registration configuration to manage the different registration modes between a first device and a second device in a wireless network, according to an embodiment of the present invention. In one embodiment, the first device is a source device, such as the source device 118, and the second device is a sink device, such as the new sink device 121 or the neighbor sink device 131 shown in FIG. 1. Also, the different device registration modes may include a domain-registration mode, a device-registration mode, and a no-registration mode.

At step 451, a user selects the first device to operate in one of the multiple device registration modes. Once the user selects one of the multiple device registration modes, although it is optional, the first device may verify an identity of the user at step 452, such as asking a security question or a password input to make sure the person who sets the device registration mode setting is a legitimate user. The registration mode from step 451 is updated only if the user is positively verified in step 452. At step 401, the user at the second device selects a registration mode, which could be Device-Only mode, Source-Domain mode or Sink-Domain mode, puts the request registration mode into the request message and sends the device registration request to the first device. At step 453, the first device receives the device registration request from the second device.

At step 454, the first device determines the device registration mode selected at step 451. This may include the first device checking a current setting of the device registration mode. This setting is set at step 451.

If the device registration mode is set to the no-registration mode, no matter what mode of registration is requested, at step 455, the first device does not let the second device register with the first device.

If the device registration mode is set to the device-registration mode, the first device will check the registration mode requested in the registration request message. If the request mode is Device-Only mode, at step 456, the first device allows the second device to register only with the first device.

Then, the second device can only receive content from the first device, but the second device cannot receive content from any other devices in the domain of the first device unless the second device specifically registers with those devices additionally. If the second device is requesting the Source-Domain mode registration, the first device will reject the request at step 455. But if the second device is requesting the Sink-Domain mode registration, the first device will allow itself to register with the domain of the second device at step 445, because the first device does not need to distribute its domain key.

If the device registration mode is set to the domain-registration mode, the first device will also check the registration mode requested in the registration request message. If the request mode is Device-Only mode, at step 456, the first device allows the second device to register only with the first device. If the second device is requesting the Source-Domain mode registration, at step 457, the first device allows the second device to register with not only the first device but also all other devices in the domain of the first device. Then, the second device can receive content from any of the devices in the domain of the first device. If the second device is requesting the Sink-Domain mode registration, at step 445, the first device allows itself to register with the second device's domain.

At step 402, the second device receives acknowledgement from the first device that the second device is allowed to register with the first device. The acknowledgement is sent only if the first device is set into the device-registration or domain-registration modes and the request mode is allowed at steps 456, 445 or 457, respectively. Thereafter, the devices at step 403 and at step 458 further exchange the registration key and even domain key for registration with a domain if applicable. In one embodiment, the first device can wirelessly be set to operate in one of multiple device registration modes for future registration, for example, using a GUI via another device that the user owns.

On the second device side, the similar checking is performed before sending out the registration request. The legitimate user of the second device can configure the device registration setting using the method same as described in step 451 and 452 for the first device. Before sending out the registration request, the second device also verifies its configuration setting against the requesting registration mode the current user wants to send in the registration request message. If the second device registration mode is set to the no-registration mode, the second device will not allow the user to send out any registration request. If the second device registration mode is set to the device-registration mode, the second device will not allow the user to send out Sink-Domain mode request. Only Device-Only mode and Source-Domain mode can be sent out. If second device registration mode is set to the domain-registration mode, the second device will allow the user to send out any mode of registration request.

FIG. 5 illustrates a flow diagram of a method for multi-mode device registration that employs a registration timer for limiting an amount of time a device may stay registered with another device. At step 550, the second device registers with the first device if the first device is configured in domain-registration mode or device-registration mode and the first and second device registered with each other using Device-Only mode, as described with respect to the method 400 shown in FIG. 4.

At step 551 a registration timer is started in the first device. At step 552, the first device determines whether the timer is expired. If the timer is expired, the second device is unregistered with the first device at step 553. At step 554, the first device deletes the registration key for the second device. Optionally, at step 555, the first device may revert to a default registration configuration mode. If the timer is not expired, the second device stays registered at step 556. Steps 552 and 556 are repeated until the timer expires. The timer may be maintained in the first device.

In one example, the registration timer is used for devices that are on loan. For example, the first device may be a gaming console that is rented to customers. The gaming console temporarily allows the renter to register the renter's TV with the gaming console for the rental period. The timer length may be set to the rental period. After the timer expires, which coincides with the expiration of the rental period, the gaming console unregisters the renter's TV and automatically reverts to the no-registration mode (which is the default registration mode in this example). When the gaming console is returned to the rental agency, the gaming console may be reset to the device or domain registration mode by an authorized user. Another way to unregister the second device is the user may manually delete the device registration key from the first device. It should be noted that this approach may or may not apply to the case that the second device joined the domain of the first device. In that case, the user has to delete the current domain key in all the devices in the domain to unregister the second device, which is very tedious.

Figure 6:
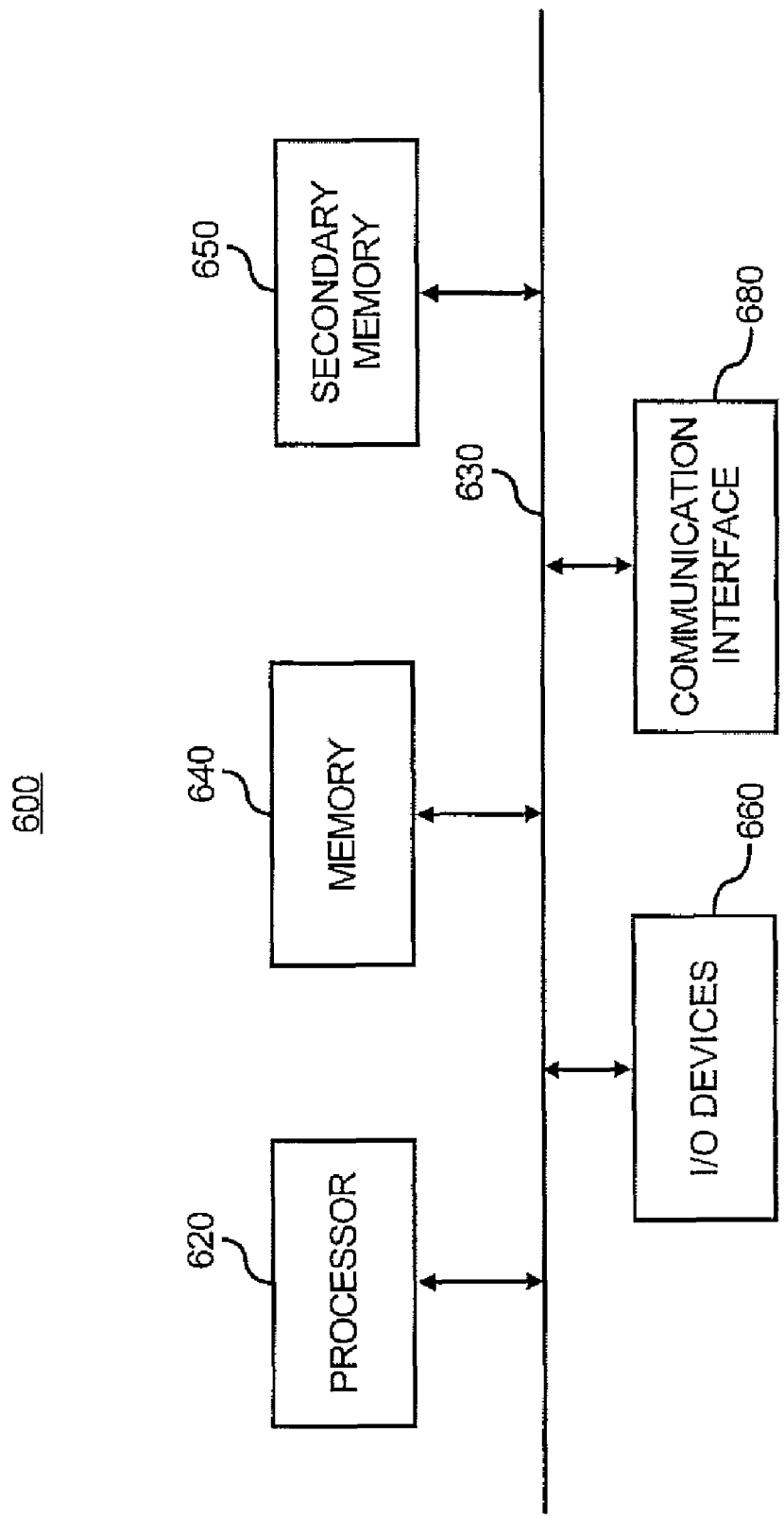
FIG. 6 shows a block diagram of a computer system that may be used as a platform for devices shown in FIG. 1, according to an embodiment of the present invention.

FIG. 6 shows the block diagram of a computer system 600 that may be used as a platform for a first device, second device, source device, or a sink device. The computer system 600 may also be used to execute one or more computer programs performing the method, steps and functions described herein, such as the three different device registration modes that may be used for devices shown in FIG. 1. The computer programs are stored in computer readable mediums.

The computer system 600 includes a processor 620, providing an execution platform for executing software. The processor 620 is configured to register a device of using multiple registration modes of FIGS. 4 and 5 and to receive a selection of one of the multiple registration modes and place the device into an allowed registration mode. In one embodiment, the processor 620 is configured to time-out a registration of a device with another device within a predetermined period of time and further configured to delete a registration key of the second device that is stored in the first device when the registration of the second device with the first device times-out. The processor 620 is further configured to generate a session key using multiple random numbers and to encrypt the domain registration key with the session key for the secure transmission. In one embodiment, the processor 620 is configured to wirelessly set a device to be one of multiple device registration modes and to verify an identity of a user when the user selects one of multiple registration modes.

Commands and data from the processor 620 are communicated over a communication bus 630. The computer system 600 also includes a main memory 640, such as a Random Access Memory (RAM), where software may reside during runtime, and a secondary memory 650. The secondary memory 650 may include, for example, a nonvolatile memory where a copy of software is stored. In one example, the secondary memory 650 also includes ROM (read only memory), EPROM (erasable, programmable ROM), EEPROM (electrically erasable, programmable ROM), and other data storage devices, include hard disks.

The computer system 600 includes I/O devices 660. The I/O devices may include a display and/or user interfaces comprising one or more I/O devices 670, such as a keyboard, a mouse, a stylus, speaker, and the like. A communication interface 680 is provided for communicating with other components. The communication interface 680 is configured to exchange messages with the other device for registration depending on the selected registration mode via a WHDI network. The communication interface 680 may be a wired or a wireless interface. The communication interface 680 may be a network interface.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims—and their equivalents—in which all terms are mean in their broadest reasonable sense unless otherwise indicated.

What is claimed is:

1. A first device configured to communicate with a second device in a network, the first device comprising:
    a processor configured to register a second device using multiple registration modes including a domain-registration mode, a device-registration mode, and a no-registration mode,
        wherein the domain-registration mode allows the second device to register with the first device and at least one other device registered with the first device,
        the device-registration mode allows the second device to register with the first device and with no other devices, and
        the no-registration mode does not allow any device to register with the first device,
        wherein the processor is further configured to receive a selection of one of the multiple registration modes and place the device in the selected registration mode;
    a data storage storing a registration key used to register the second device with the first device; and
    a network interface configured to exchange messages with the second device for registration depending on the selected registration mode via a network.

2. The first device of claim 1, wherein the registration key comprises a device registration key and/or a domain registration key for a domain the first device belongs to.

3. The first device of claim 2, wherein the network is a Wireless High Definition Interface (WHDI) network and the device registration key and the domain registration key are used to register WHDI devices in the WHDI network with the first device.

4. The first device of claim 3, wherein the domain registration key is securely transmitted to the second device via the network interface to register the second device with the first device.

5. The first device of claim 3, wherein the processor is configured to generate a session key using multiple random numbers and to encrypt the domain registration key with the session key for the secure transmission.

6. The first device of claim 1, wherein the processor is further configured to unregister the second device with the first device after a predetermined period of time.

7. The first device of claim 6, wherein the processor is further configured to delete a registration key of the second device that is stored in the first device if the second device is unregistered with the first device.

8. The first device of claim 7, wherein the first device reverts to a default registration mode after the predetermined period of time, wherein the default mode is comprised of one of the domain-registration mode, the device-registration mode, and the no-registration mode.

9. The first device of claim 1, wherein the processor is further configured to verify an identity of a user when the user selects one of multiple registration modes.

10. The first device of claim 1, wherein the first device is a source device in a WHDI network.

11. The first device of claim 1, wherein if the device registration mode is set to the domain-registration mode, the processor is further configured to identify a registration mode requested in a received registration request message, and set the first device to the requested registration mode.

12. A method of multi-mode device registration, the method comprising:
    receiving a selection of a registration mode at a device, wherein the device is configured to operate in any of multiple registration modes, the multiple registration modes including
        a domain-registration mode allowing another device to register with the device and at least one other device registered with the device,
        a device-registration mode allowing another device to register with the device and with no other devices registered with the device, and
        a no-registration mode not allowing any device to register with the device;
    setting the device to operate in the selected registration mode, wherein the selected registration mode includes one of the multiple registration modes; and
    registering another device with the device if the device is operating in the domain-registration mode or the device-registration mode.

13. The method of claim 12, further comprising:
    storing a domain registration key in the device; and
    securely exchanging the domain registration key with the another device for registration.

14. The method of claim 12, wherein the device is in a Wireless High Definition Interface (WHDI) network, and registering another device further comprises:
    registering another WHDI device with the device.

15. The method of claim 12, further comprising:
    timing-out a registration of the another device within a predetermined period of time.

16. The method of claim 15, further comprising:
    deleting a domain registration key of the another device that is stored in the device when the registration of the another device with the device times out.

17. The method of claim 12, wherein receiving a selection of a registration mode further comprises:
    verifying an identity of a user; and
    allowing a user to select the registration mode if the identity is verified.

18. The method of claim 12, wherein if the device registration mode is set to the domain-registration mode, the method further comprises:
    identifying a registration mode requested in a received registration request message; and
    setting the device to the requested registration mode.

19. A computer readable storage medium storing at least one computer program that when executed performs a method of multi-mode device registration, the method comprising:

receiving a selection of a registration mode at a device, wherein the device is configured to operate in any of multiple registration modes, the multiple registration modes including
- a domain-registration mode allowing another device to register with the device and at least one other device registered with the device,
- a device-registration mode allowing another device to register with the device and with no other devices registered with the device, and
- a no-registration mode not allowing any device to register with the device;

setting the device to operate in the selected registration mode, wherein the selected registration mode includes one of the multiple registration modes; and registering another device with the device if the device is operating in the domain-registration mode or the device-registration mode.

20. The computer readable medium of claim 19, wherein the method further comprises:
- storing a domain registration key in the device; and
- securely exchanging the domain registration key with the another device for registration.

* * * * *